C. H. BAKER.
SPRAYING DEVICE.
APPLICATION FILED DEC. 17, 1918.
1,364,424.
Patented Jan. 4, 1921.
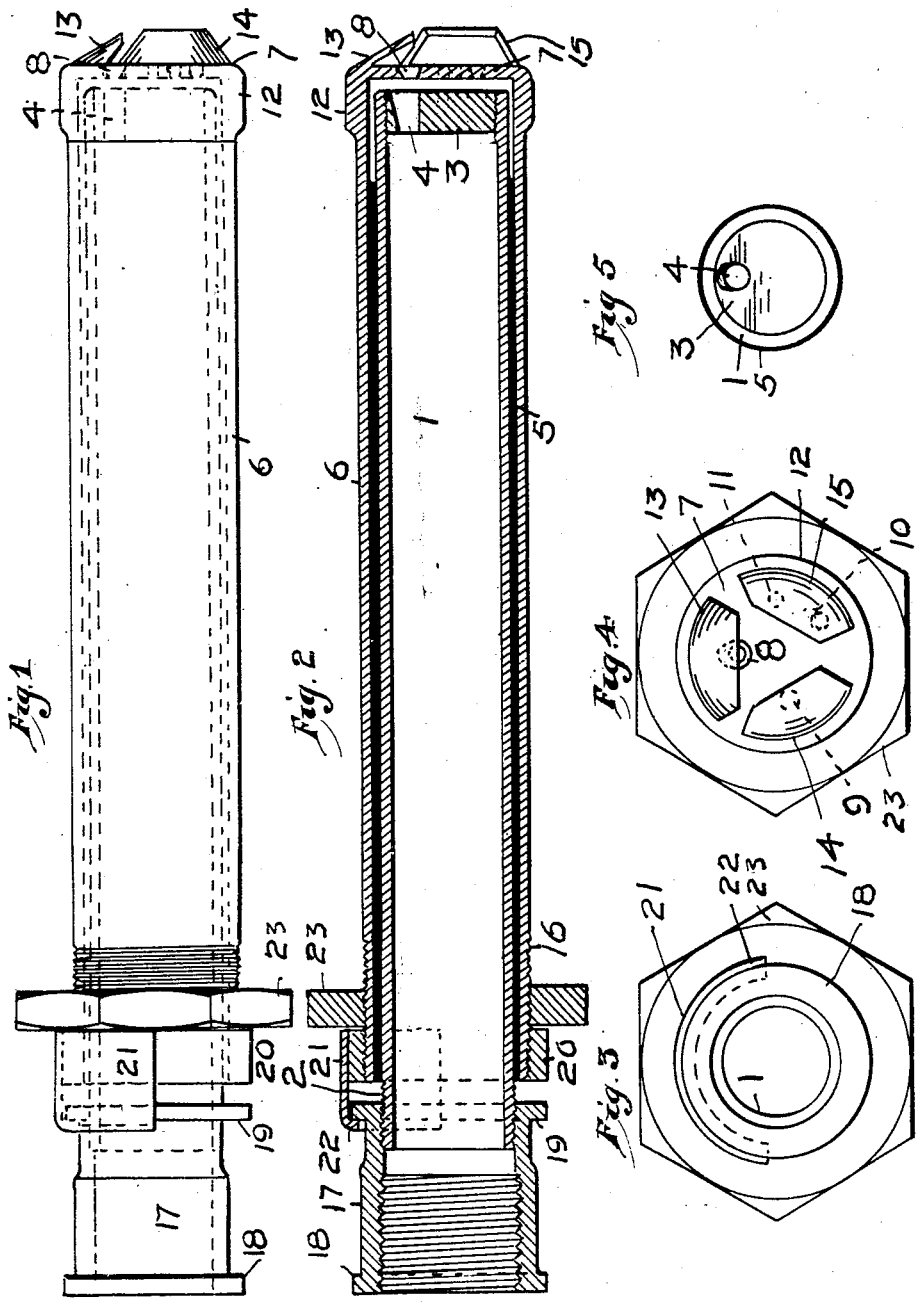
WITNESS
INVENTOR.
Charles H. Baker
By Max H. Srolovitz
Attorney

UNITED STATES PATENT OFFICE.

CHARLES H. BAKER, OF PITTSBURGH, PENNSYLVANIA.

SPRAYING DEVICE.

1,364,424.     Specification of Letters Patent.     Patented Jan. 4, 1921.

Application filed December 17, 1918. Serial No. 267,189.

*To all whom it may concern:*

Be it known that I, CHARLES H. BAKER, a citizen of the United States of America, residing at Pittsburgh, in the county of Allegheny and State of Pennsylvania, have invented certain new and useful Improvements in Spraying Devices, of which the following is a specification.

This invention relates to a spraying device for use in connection with blast furnaces, ladles, etc., for looming, coating or white washing the brick thereof, or for any other purpose wherein the device is found applicable, and has for its object to provide a device for such purpose, in a manner as hereinafter set forth, with means for controlling or regulating discharge therefrom, as well as preventing the clogging thereof, when using the device for spraying.

Further objects of the invention are to provide a device for the purpose set forth and in a manner as hereinafter referred to which is simple in its construction and arrangement, strong, durable, capable of rough usage, efficient and convenient in its use, readily assembled and adjusted, and comparatively inexpensive to manufacture.

With the foregoing and other objects in view the invention consists of the novel construction, combination and arrangement of parts as hereinafter set forth and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1, is a side elevation of a spraying device in accordance with this invention, Fig. 2 is a longitudinal sectional view thereof, Fig. 3 is an end view from the rear, Fig. 4 is an end view from the front, Fig. 5 is an end view from the front of the nozzle member.

Referring to the drawings in detail 1 denotes a nozzle member formed of a cylindrical hollow element, by way of example a short length of pipe, and which has its rear end peripherally threaded as at 2. Secured in the forward end of the member 1, by threads or otherwise, is a plug 3, which closes said forward end and is formed with an eccentrically disposed flaring passage 4. The periphery of the member 1, at a point removed from each end is inclosed or incased or covered entirely or substantially so by any suitable material, as at 5, such as rubber, rubberized fabric, insulation material, forming a packing to prevent leakage when the member 1 is positioned in the spraying element to be hereinafter referred to. The packing may be dispensed with if desired.

The spraying element consists of an elongated hollow tube 6, closed at its forward end by an integral head 7, provided with a series of eccentrically disposed openings 8, 9, 10 and 11, of different diameters relatively to each other. Each of the openings flare outwardly whereby means is provided to prevent any substance clogging therein. The forward end of the tube 6 is enlarged as at 12.

Formed integral with the outer face of the head 7, is a series of inclined baffles 13, 14, 15, which constitute means for breaking up the fluid into spray when the fluid is discharged through an opening in the head 7. The baffles are arranged equi-distant apart with respect to each other and the arrangement of the baffles relative to the openings is, the baffle 13 overlaps the opening 8, the baffle 14 the opening 9, and the baffle 15 the openings 10 and 11.

The tube 6 is formed of metallic material and constitutes the handle of the device, and has its rear end peripherally threaded at 16. Adjustably mounted on the threaded rear end of the member 1 is an interiorly threaded and flanged coupling 17 for connecting the member 1 with a source of supply. The coupling 17 is flanged at each end as at 18, 19.

Adjustably mounted on the threaded rear end of the tube 6 is an interiorly threaded collar 20, with which is formed a semi-cylindrical wing 21 projecting rearwardly from the collar and terminating in an inwardly extending flange 22, which associates with the flange 19 for connecting the tube 6 with the coupling 17. Mounted on the rear end of the tube 6 is a lock nut 23 for the collar 20.

By shifting the spraying element around the nozzle the passage 4 can be adjusted to aline with any of the openings 8, 9, 10 and 11, whereby the discharge can be controlled. Owing to the adjustability of the collar 20, the plug 3, can be positioned any suitable distance relative to the head 7. The packing on the periphery of the nozzle although it prevents leakage, does not prevent the shifting of the spraying element on the nozzle.

The lock nut and enlarged forward end prevents the body portion of the spraying element from coming in contact with the ground or other support when laid down and also enables said element to be readily lifted therefrom when desired.

If any of the openings become clogged the passage 4 can be adjusted to aline therewith and the discharge therefrom will readily clean the opening as the latter flares outwardly.

What I claim is:—

1. A spraying device comprising a nozzle having an eccentrically disposed discharge passage, and a spraying element inclosing and shiftable around said nozzle and provided with a head having openings of different diameters capable of registering with said passage, and baffles overlapping said openings and projecting forwardly from said head.

2. A spraying device comprising a nozzle having its forward end provided with a discharge passage, a spraying element completely inclosing said nozzle and having its forward end provided with a head opposing the forward end of the nozzle, said head having openings of different diameters capable of registering with said passage, a flanged coupling attached to the inner end of the nozzle for connecting the latter with a source of supply, and means having threaded engagement with said element and further engaging with the flange of said coupling for adjustably connecting said element to the nozzle.

3. A spraying device comprising a nozzle having an eccentrically disposed discharge opening or passage, a spraying element shiftable around said nozzle and having a head provided with openings of different diameters capable of registering with said passage, a coupling attached to the inner end of the nozzle, and means having threaded engagement with the inner end of said element and overlapping the forward end of said coupling for adjustably attaching the said element to said nozzle.

4. A spraying device comprising an inner and an outer hollow element, one arranged within the other, said inner element having a discharge passage and said outer element having openings capable of registering with said passage, a coupling at the inner end of the inner element for connecting it with a source of supply, and means on the inner end of the outer element and engaging with the coupling for adjustably connecting said elements together and for maintaining the outer element in adjusted position relative to the inner element.

5. A spraying device comprising an inner and an outer hollow element one arranged within the other, said inner element having a discharge passage and said outer element having openings capable of registering with said passage when the outer element is shifted, a flanged coupling secured to the inner end of the inner element, a collar having threaded engagement with the periphery of said outer element and provided with a semi-cylindrical wing engaging with the flange of the coupling for adjustably connecting the two elements together at their inner ends, and a lock nut for said collar.

In testimony whereof I affix my signature.

CHARLES H. BAKER.